United States Patent
Pollock et al.

(10) Patent No.: US 9,269,188 B2
(45) Date of Patent: *Feb. 23, 2016

(54) DENSIFYING AND COLORIZING POINT CLOUD REPRESENTATION OF PHYSICAL SURFACE USING IMAGE DATA

(71) Applicant: Geodigital International Inc., Hamilton (CA)

(72) Inventors: Richard James Pollock, Aurora (CA); Alastair Nigel Jenkins, Etobicoke (CA); Douglas Jared Parent, Oakville (CA)

(73) Assignee: GEODIGITAL INTERNATIONAL INC., Hamilton, Ontario (*) Notice: Subject to any disclaimer, the term of this patent is extended or adjusted under 35 U.S.C. 154(b) by 0 days.

This patent is subject to a terminal disclaimer.

(21) Appl. No.: 14/700,224

(22) Filed: Apr. 30, 2015

(65) Prior Publication Data
US 2015/0254901 A1 Sep. 10, 2015

Related U.S. Application Data

(63) Continuation of application No. 14/264,324, filed on Apr. 29, 2014, now Pat. No. 9,053,572, which is a continuation of application No. 13/354,596, filed on Jan. 20, 2012, now Pat. No. 8,731,247.

(51) Int. Cl.
| | |
|---|---|
| G06K 9/00 | (2006.01) |
| G06T 17/10 | (2006.01) |
| G01S 17/02 | (2006.01) |
| G01S 17/89 | (2006.01) |
| G01C 11/02 | (2006.01) |

(52) U.S. Cl.
CPC .......... *G06T 17/10* (2013.01); *G01C 11/02* (2013.01); *G01S 17/023* (2013.01); *G01S 17/89* (2013.01); *G06T 2210/36* (2013.01)

(58) Field of Classification Search
None
See application file for complete search history.

(56) References Cited

U.S. PATENT DOCUMENTS

| | | | |
|---|---|---|---|
| 2007/0065002 A1 | 3/2007 | Marzell et al. | |
| 2008/0260237 A1* | 10/2008 | Savolainen et al. | 382/154 |
| 2011/0087662 A1* | 4/2011 | Darby et al. | 707/736 |
| 2011/0310091 A2* | 12/2011 | Yoshida et al. | 345/419 |

FOREIGN PATENT DOCUMENTS

| | | |
|---|---|---|
| CA | 2252409 A1 | 10/1997 |
| CN | 101901501 B | 12/2010 |
| WO | 2010108643 A1 | 9/2010 |

OTHER PUBLICATIONS

PCT International Search Report; International Application No. PCT/BA2013/000053; Applicant's File Reference: H8311409PCT; Applicant: Geodigital International Inc.; Date of Actual Completion of International Search: Mar. 28, 2013.

* cited by examiner

*Primary Examiner* — Atiba O Fitzpatrick
(74) *Attorney, Agent, or Firm* — Pearne & Gordon LLP

(57) ABSTRACT

Image data obtained from an image sampling of a physical surface is integrated with position data obtained from a three-dimensional surface sampling of the same physical surface by combining data from the images with the measured surface points from the surface sampling to create additional "implied" surface points between the measured surface points. Thus, the originally obtained point cloud of measured surface points is densified by adding the implied surface points. Moreover, the image data can be used to apply colors to both the implied data points and the measured data points, resulting in a colored three-dimensional representation of the physical surface that is of higher resolution than a representation obtained from only the measured surface points.

9 Claims, 7 Drawing Sheets

DENSIFYING AND COLORIZING POINT CLOUD REPRESENTATION OF PHYSICAL SURFACE USING IMAGE DATA

TECHNICAL FIELD

The present invention relates to imaging of surfaces, and more particularly to generating a colored three-dimensional representation of a three-dimensional physical surface.

BACKGROUND

It is known to create three-dimensional models of physical surfaces, such as a forest, an urban area or the terrain of a utility corridor, from a location sampling of the physical surface obtained using a three-dimensional scanning range finder. For example, such measurements may be obtained by flying over the terrain of interest in an aircraft and scanning the ground surface using a scanning laser range finder such as "LiDAR" (Light Detection and Ranging).

The resulting data, once processed, will take the form of a group of spaced-apart, discrete, measured surface points (a "point cloud") representing the physical surface in a three-dimensional coordinate reference frame (typically Cartesian). The spacing between the measured surface points results from the inherent limitations in resolution of the scanning range finder, and can be significant when the physical surface being scanned is large and the details of the physical surface are fine, such as when conducting an aerial survey of an urban area that is required to capture fine architectural details of individual buildings. Moreover, commercially available three-dimensional scanning range finders for terrain measurement only measure depth and not color. As a result, the visual representation generated from an airborne three-dimensional scan of a ground surface appears as a collection of uncolored or, at best, monochrome (gray level toned) dots, which can make it difficult to resolve details that are distinguished more by color than by shape. Although photographic images can be overlaid on models based on geometric solids that are derived from the surface samples, the derivation of such models is a lengthy process that requires considerable manual intervention. While there is an emerging technique known as "flash LiDAR" that obtains both range and color information, it is currently much more expensive than conventional LiDAR and does not provide sufficient surface detail or range accuracy for many applications.

SUMMARY

Image data obtained from an image sampling of a physical surface is integrated with measured surface point data obtained from a three-dimensional surface sampling of the same physical surface by combining the image data with the measured surface points to create additional "implied" surface points between the measured surface points. Thus, the originally obtained point cloud of measured surface points is densified by adding the implied surface points. Moreover, the image data can be used to apply colors to both the implied surface points and the measured surface points, resulting in a colored three-dimensional representation of the physical surface that is of higher resolution than a representation obtained from only the measured surface points.

A computer-implemented method for densifying and colorizing a point cloud representation of a physical surface comprises receiving a set of measured surface points representing a surface sampling of a three-dimensional physical surface, with each measured surface point having a position in a three-dimensional coordinate reference frame, and receiving at least one image acquired by an image acquisition unit and representing an image sampling of the physical surface. The image sampling of the physical surface in the image(s) at least partially overlaps the surface sampling of the physical surface and is denser than the surface sampling of the physical surface. Each image is a digital image comprising a plurality of pixels each having a color and an image position in the image. The method further comprises receiving image metadata associated with each image, with the image metadata including an estimate of position and orientation of the image acquisition unit in the coordinate reference frame at the time the image acquisition unit acquired the image to which the image metadata corresponds, and further includes calibration parameters for the image acquisition unit. For each image, the method isolates from the set of measured surface points a subset of measured surface points comprising those measured surface points that are within the field of view of that image and uses the image positions of the pixels in that image, the subset of measured surface points and the image metadata associated with that image to calculate colorized implied surface points. Each colorized implied surface point has a position in the coordinate reference frame, is associated with a corresponding pixel, and has the color of its corresponding pixel.

The method may further comprise using at least the colorized implied surface points to form a three-dimensional, colored representation of the physical surface in the coordinate reference frame.

In one embodiment of the method, isolating from the set of measured surface points the subset of measured surface points comprising those measured surface points that are within the field of view of a particular image comprises determining an estimated half of an angular field of view for that image and, for each measured surface point in the set of measured surface points, determining a test angle between (a) an estimated optical axis for the image acquisition unit at the time that image was acquired and (b) a line extending between that measured surface point and the estimated focal point of the image acquisition unit when that image was acquired, and comparing the test angle to the estimated half of the angular field of view for that image. Responsive to a determination that the test angle does not exceed the estimated half of the angular field of view for that image by more than a test angle threshold, the corresponding measured surface point is added to the subset of measured surface points comprising those measured surface points that are within the field of view of that image. Responsive to a determination that the test angle exceeds the estimated half of the angular field of view for that image by more than the test angle threshold, the corresponding measured surface point is omitted from the subset of measured surface points comprising those measured surface points that are within the field of view of that image.

In a particular embodiment, the test angle threshold is zero such that, responsive to a determination that the test angle is less than or equal to the estimated half of the angular field of view for that image, the corresponding measured surface point is added to the subset of measured surface points comprising those measured surface points that are within the field of view of that image.

Using the image positions of the pixels in a particular image, the associated subset of measured surface points and the image metadata associated with that image to calculate colorized implied surface points may comprise, for each pixel in that image with which a colorized implied surface point is associated, using the image position of that pixel and the image metadata associated with that image to calculate an estimated projected position of that pixel on the physical surface in the coordinate reference frame, identifying a corresponding neighborhood of nearest measured surface points to the estimated projected position of the pixel on the physical surface, using the neighborhood of nearest measured surface points and the image metadata associated with that image to determine the position of an implied surface point associated with that pixel, and assigning to the implied surface point the color of the corresponding pixel to form the colorized implied surface point.

A positioning acceptance test may be applied to the neighborhood of nearest measured surface points before using the neighborhood of nearest measured surface points and the image metadata associated with that image to determine the position of an implied surface point associated with a particular pixel. Responsive to a determination that the neighborhood of nearest measured surface points passes the positioning acceptance test, the neighborhood of nearest measured surface points and the image metadata associated with that image are used to determine an implied surface point associated with that pixel and the color of the corresponding pixel is assigned to the implied surface point to form the colorized implied surface point. Responsive to a determination that the neighborhood of nearest measured surface points fails the positioning acceptance test, determination of any implied surface point associated with that pixel is omitted.

The positioning acceptance test may comprise testing whether any measured surface points in the neighborhood of nearest measured surface points are further away from the estimated projected position of that pixel than a positioning distance threshold. A determination that at least one measured surface point in the neighborhood of nearest measured surface points is further away from the estimated projected position of that pixel than the positioning distance threshold may result in the neighborhood of nearest measured surface points failing the positioning acceptance test, and a determination that no measured surface points in the neighborhood of nearest measured surface points are further away from the estimated projected position of that pixel than the positioning distance threshold may result in the neighborhood of nearest measured surface points passing the positioning acceptance test.

Using the neighborhood of nearest measured surface points for a particular pixel and the image metadata associated with the image to determine an implied surface point associated with that pixel may comprise fitting an estimated three-dimensional surface to the neighborhood of nearest measured surface points, intersecting a positioned sightline from the image acquisition unit to that pixel with the estimated three-dimensional surface to identify an intersection point, with the positioned sightline calculated using the image position of that pixel and the image metadata, and setting the intersection point as the position of the implied surface point associated with that pixel.

Using at least the colorized implied surface points to form a three-dimensional, colored representation of the physical surface in the coordinate reference frame may comprise, for each image, assigning implied colors to at least some measured surface points in the subset of measured surface points to generate colorized measured surface points, with the implied color assigned to each colorized measured surface point being determined from the colors of nearby colorized implied surface points, and using the colorized implied surface points and the colorized measured surface points to form the three-dimensional, colored representation of the surface in the coordinate reference frame.

Assigning implied colors to at least some measured surface points in the subset of measured surface points to generate colorized measured surface points may comprise, for each measured surface point to which an implied color is assigned, using the three-dimensional position of that measured surface point to identify a corresponding neighborhood of nearest colorized implied surface points to that measured surface point and using the respective colors of each colorized implied surface point in the neighborhood of nearest colorized implied surface points to determine the implied color for that measured surface point.

A coloring acceptance test may be applied to the neighborhood of nearest colorized implied surface points before assigning an implied color to a particular measured surface point in the subset of measured surface points to generate a resulting colorized measured surface point. Responsive to a determination that the neighborhood of nearest colorized implied surface points passes the coloring acceptance test, the respective colors of each colorized implied surface point in the neighborhood of nearest colorized implied surface points are used to determine the implied color for that measured surface point. Responsive to a determination that the neighborhood of nearest colorized implied surface points fails the coloring acceptance test, determination of any implied color for that measured surface point is omitted.

The coloring acceptance test may comprise testing whether any colorized implied surface points in the neighborhood of nearest colorized implied surface points are further away from the three-dimensional position of that measured surface point than a coloring distance threshold. In one embodiment, a determination that at least one colorized implied surface point in the neighborhood of nearest colorized implied surface points is further away from the three-dimensional position of that measured surface point than the coloring distance threshold results in the neighborhood of nearest colorized implied surface points failing the coloring acceptance test, whereas a determination that no colorized implied surface points in the neighborhood of nearest colorized implied surface points are further away from the three-dimensional position of that measured surface point than the coloring distance threshold results in the neighborhood of nearest colorized implied surface points passing the coloring acceptance test.

The present disclosure also contemplates computer systems having at least one processor and memory coupled to the processor, with the memory containing instructions which, when executed by the at least one processor, cause the computer system to implement one or more of the methods described herein.

The present disclosure is further directed to computer program products comprising a non-transitory computer readable storage medium having computer readable program code embodied therewith for implementing one or more of the methods described herein.

The above summary is provided only by way of overview, and is not intended to limit the scope of the appended claims.

BRIEF DESCRIPTION OF THE DRAWINGS

These and other features of the invention will become more apparent from the following description in which reference is made to the appended drawings wherein.

DETAILED DESCRIPTION

Figure 1:
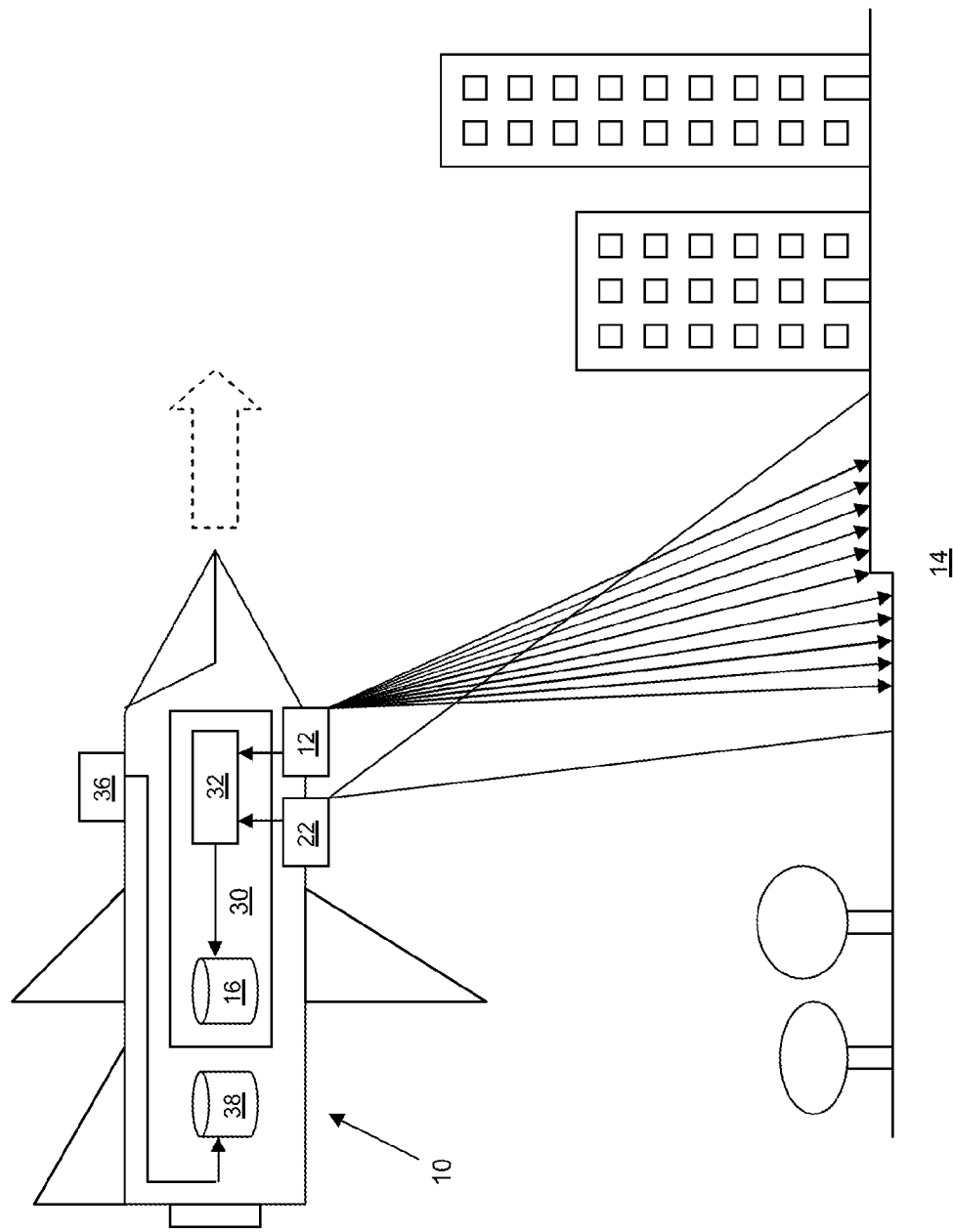
FIG. 1 is a schematic representation of an aircraft obtaining both a surface sampling and an image sampling of a physical surface.

Within this specification, reference numerals are used to refer to elements and features in the drawings, and letters, with and without subscripts, are used as variables and the like in presenting mathematical concepts.

Reference is now made to FIG. 1. As shown schematically in FIG. 1, an aircraft 10 carries a surface sampling unit 12, such as a scanning laser range finder, and uses the surface sampling unit 12 to obtain a surface sampling representing a three-dimensional physical surface 14. In the exemplary illustration in FIG. 1, the surface 14 is the surface defined by the buildings, streets, trees etc. of an urban area; the surface may also be, for example, the terrain over which a power transmission line is run. The surface sampling representing the physical surface 14 is stored in a main data storage unit 16 associated with the surface sampling unit 12. Where the surface sampling unit 12 is a scanning laser range finder, the surface sampling representing the physical surface 14 is stored as pairs of range and direction values according to an internal reference system of the surface sampling unit 12, and these measurements are time-stamped to facilitate further processing, as described below.

The aircraft 10 also carries an image acquisition unit 22, such as a digital camera, and uses the image acquisition unit 22 to obtain a set I of m digital images $\{I_1, I_2, \ldots, I_m\}$, with each digital image $I_i$ representing an image sampling of the physical surface 14. The images I are stored in the data storage unit 16; optionally the images I may be stored in a different data storage unit. Each image $I_i$ consists of a sequence of pixels $<p_1, p_2, \ldots, p_q>$, and each pixel $P_j$ has a color value $c_j$ and an image position within the respective image. Thus, the first image $I_1$ will consist of a first sequence of pixels, the second image $I_2$ will consist of a second sequence of pixels, and so on. The images $\{I_1, I_2, \ldots, I_m\}$ are time-stamped so that the position and orientation of the image acquisition unit 22 at the time of acquisition of each image $\{I_1, I_2, \ldots, I_m\}$ can be determined, as described in greater detail below.

Typically, the data storage unit 16 forms part of an onboard data processing system 30 carried by the aircraft 10. The onboard data processing system 30 includes at least one processing unit 32 that manages acquisition and storage of the range and direction values from the surface sampling unit 12 as well as acquisition and storage of the set of images I.

In addition to the surface sampling unit 12 and the image acquisition unit 22, the aircraft 10 carries a position and orientation measurement system 36, such as a Global Navigation Satellite System receiver that is coupled with an inertial measurement unit. The position and orientation measurement system 36 stores the position and orientation measurements in a geo-referencing data storage unit 38; alternatively the position and orientation measurements may be managed by the onboard data processing system 30 and stored in the main data storage unit 16.

The range and direction values from the surface sampling unit 12 are processed by using the time-stamps to combine them with the corresponding position and orientation measurements from the position and orientation measurement system 36. The result of this processing is a set P of n measured surface points $\{P_1, P_2, \ldots, P_n\}$ with each measured surface point $P_i$ representing a point on the physical surface 14 and having a three-dimensional position in a coordinate reference frame. For example, for Cartesian coordinate reference frame R, each measured surface point $P_i$ consists of an (X, Y, Z) coordinate triplet. Processing of the range and direction values from the surface sampling unit 12 is typically carried out after the aircraft 10 has landed, usually by a different data processing system from the onboard data processing system 30.

During processing, the position and orientation measurements from the position and orientation measurement system 36 are also used to obtain, for each image $I_i$, an estimate of the position and orientation of the image acquisition unit 22 relative to the physical surface 14 at the time the respective image was acquired. The time-stamps on the images are used in deriving these estimates. The estimated position and orientation of the image acquisition unit 22 are represented in the same Cartesian coordinate reference frame R as are the measured surface points $P_1, P_2, \ldots, P_n$, and will form part of the image metadata for the corresponding image.

In addition to the position and orientation estimates, the image metadata for each image $I_i$ also includes calibration parameters for the image acquisition unit 22, such as the calibrated focal length of the image acquisition unit 22 at the time $I_i$ was acquired.

The exact parameters included within the image metadata depend on the design of the particular image acquisition unit 22. Generally, these will include parameters that model the optical distortions and mechanical imperfections in the images that are caused by the image acquisition unit 22 so that these optical distortions and mechanical imperfections can be compensated for. This compensation is required in order to obtain accurate sightline vectors. The rest of the parameters define the fixed position and orientation of the image acquisition unit 22 within the local coordinate system of the position and orientation measurement system 36. This allows the measured position and orientation of the local coordinate system of the position and orientation measurement system 36 to be transformed into the position and orientation of the image acquisition unit 22. Similar parameters also define the fixed position and orientation of the surface sampling unit 12 within the local coordinate system of the position and orientation measurement system 36.

Thus, the image metadata for each image $I_i$ includes data that are sufficient, and sufficiently accurate, so that for each pixel $p_j$ in the respective image $I_i$ a sufficiently accurate positioned sightline unit vector $s_j$ in the Cartesian coordinate reference frame R may be derived; such derivation will be within the capability of one skilled in the art, now informed by the herein disclosure. The position of the tail of the positioned sightline unit vector $s_j$ is the estimated position of the focal point $FP_i$ of the image acquisition unit 22 when the relevant image $I_i$ was acquired. The direction of the positioned sight-line unit vector $s_j$ is the estimated direction from the position of $FP_i$ when the image $I_i$ was acquired to the location in the scene imaged by the pixel $p_j$.

As can be seen in FIG. 1, the image sampling of the physical surface 14 represented by the set of images $\{I_1, I_2, \ldots, I_m\}$ at least partially overlaps the surface sampling of the physical surface 14 represented by the set P of measured surface points $\{P_1, P_2, \ldots, P_n\}$. The image sampling is denser than the surface sampling.

As illustrated in FIG. 1, in a preferred embodiment the surface sampling unit 12 and the image acquisition unit 22 are carried on the same aircraft 10 and the surface sampling and image sampling are carried out on the same flight. This considerably simplifies the process of establishing a sufficiently accurate geometric relationship between the surface sampling unit 12 and the image acquisition unit 22 and the data outputs therefrom, and is also less expensive than using separate flights to carry out the surface sampling and the image sampling. In addition, although in FIG. 1 the aircraft 10 is shown as a fixed-wing aircraft, other types of aircraft, such as helicopters, may also be used.

Figure 2:
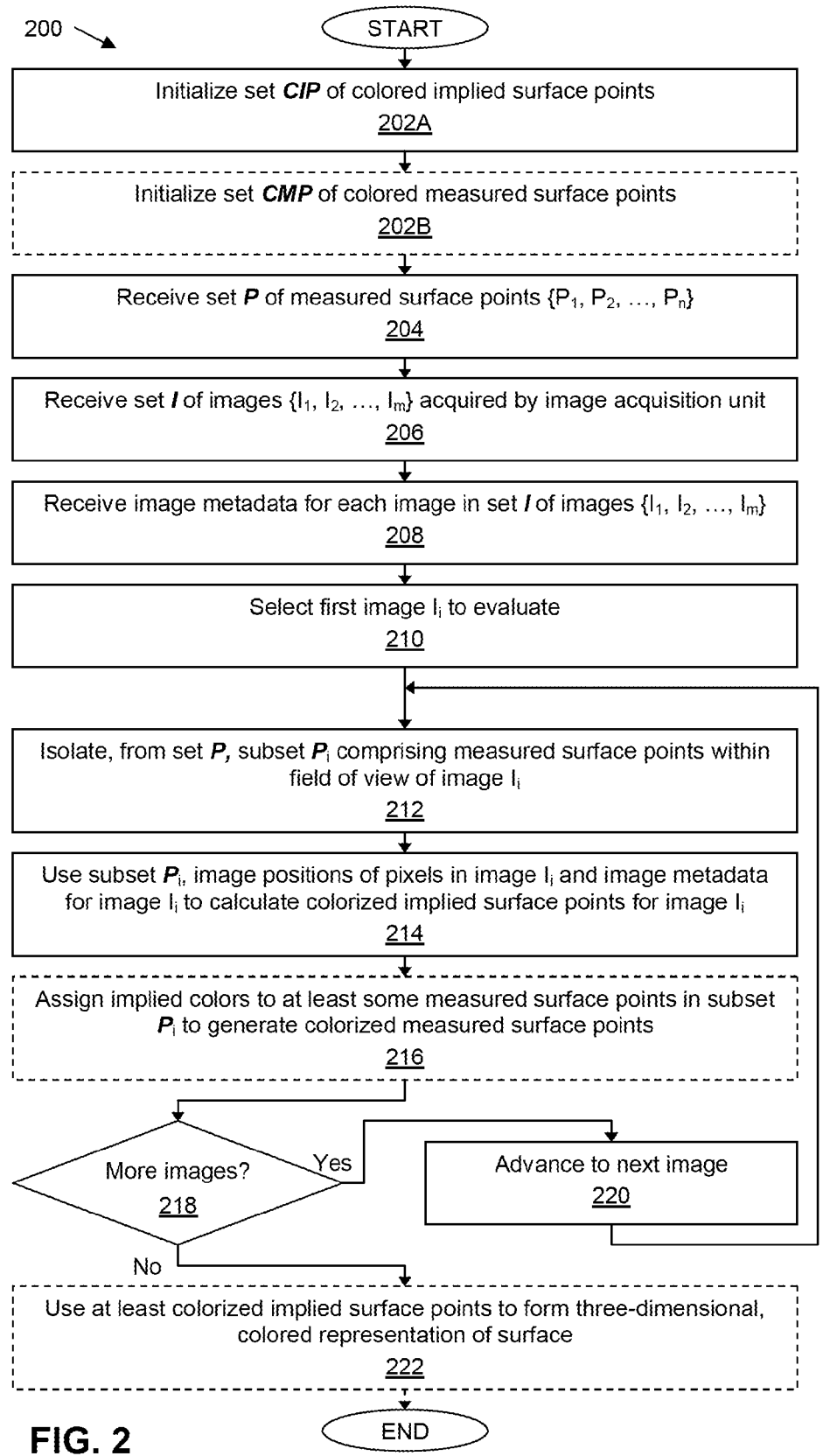
FIG. 2 is a flow chart illustrating an exemplary method for densifying and colorizing a point cloud representation of a physical surface.

Reference is now made to FIG. 2, which is a flow chart illustrating an exemplary method 200 for densifying and colorizing a point cloud representation of a physical surface by using image data to colorize and densify the point cloud of measured surface points. The inputs used by the exemplary method 200 (including sub-methods and sub-procedures thereof) are:

the overall set P of n measured surface points $\{P_1, P_2, \ldots, P_n\}$;

a set I of m digital images $\{I_1, I_2, \ldots, I_m\}$;

the image metadata for the set I of digital images, which includes, for each image $I_i$, an estimate of the position and orientation of the image acquisition unit 22 at the time the image $I_i$ was acquired as well as calibration parameters for the image acquisition unit 22; and scalar values nsf, nci (both integers) and t.

The method 200 also makes use also makes use of spatial indexing functions for creating a three-dimensional spatial index that returns the n closest elements to that location from a set of indexed points in the Cartesian coordinate reference frame R as well as a three-dimensional surface fitting function and a three-dimensional color interpolation function. Suitable spatial indexing functions, three-dimensional indexing functions and three-dimensional color interpolation functions are well-known in the art and selection thereof is within the capability of one skilled in the art, now informed by the herein disclosure.

The integer value nsf represents the number of points that are required as input by the particular three-dimensional surface fitting function used, and the integer value nci similarly represents the number of colored points that are required as input by the particular three-dimensional color interpolation function. The scalar value t is a distance threshold value, chosen to be a reasonable upper limit on the distance between adjacent measured points on the same continuous surface.

At steps 202A and 202B, the method 200 initializes two sets of colorized surface points: a set CIP of colorized implied surface points and a set CMP of colorized measured surface points, respectively. Both sets are initially empty. A colorized surface point is a location coordinate triplet (X, Y, Z) in the Cartesian coordinate reference frame R that is coupled with a color value. A colorized measured surface point is a measured surface point from the overall set P of n measured surface points $\{P_1, P_2, \ldots, P_n\}$ which has been assigned a color, and a colorized implied surface point is a calculated (as opposed to measured) surface point that will form part of the three-dimensional representation of the physical surface 14 to which a color has been assigned. If step 216 is omitted from the method 200 (as explained below), step 202B may be omitted and only the set CIP of colorized implied surface points is initialized.

At step 204, the method receives the set P of measured surface points $\{P_1, P_2, \ldots, P_n\}$ representing a surface sampling of the physical surface 14. As noted above, in the illustrated embodiment, each of the measured surface points $\{P_1, P_2, \ldots, P_n\}$ has a position (X,Y,Z) in the three-dimensional Cartesian reference frame R. Thus, the set P of measured surface points $\{P_1, P_2, \ldots, P_n\}$ is an initial point cloud representation of the physical surface 14.

At step 206, the method 200 receives the set I of images $\{I_1, I_2, \ldots, I_m\}$ acquired by the image acquisition unit 22 and representing an image sampling of the physical surface 14. Typically, the set I of images $\{I_1, I_2, \ldots, I_m\}$ will consist of a plurality of images $I_1, I_2, \ldots, I_m$; it is also contemplated that the set I may consist of a single image I. Each of the images $I_1, I_2, \ldots, I_m$ comprises a plurality of pixels $p_1, p_2, \ldots, p_q$ with each pixel $p_j$ having a color value $c_j$ and an image position in the respective image. The image sampling in each of the images $I_1, I_2, \ldots, I_m$ partially overlaps the surface sampling of the physical surface 14 as represented by the set P of measured surface points $\{P_1, P_2, \ldots, P_n\}$ and is more dense than that surface sampling.

At step 208, the method 200 receives the image metadata associated with each image in the set I of images $\{I_1, I_2, \ldots, I_m\}$. As noted above, the image metadata for each image $I_i$, $I_2, \ldots, I_m$ includes an estimate of the position and orientation of the image acquisition unit in the Cartesian coordinate reference frame R at the time the image acquisition unit 22 acquired the respective image $I_1, I_2, \ldots, I_m$ image, and also includes calibration parameters for the image acquisition unit 22 that acquired the images $I_1, I_2, \ldots, I_m$.

Steps 202A, 202B, 204, 206 and 208 may be carried out in any suitable order, or substantially simultaneously, as long as the images $\{I_1, I_2, \ldots, I_m\}$ remain associated with their respective metadata.

At step 210, the method 200 selects a first image to be evaluated. The precise selection procedure implemented at step 210 is not crucial; step 210 is an initialization step that cooperates with subsequent steps 218, 220 in the method 200 to ensure that the entire set I of images $\{I_1, I_2, \ldots, I_m\}$ is handled.

At step 212, the method 200 isolates from the set P of n measured surface points $\{P_1, P_2, \ldots, P_n\}$ a subset $P_i$ of measured surface points comprising those measured surface points that are within the field of view of the image $I_i$ currently being evaluated by the method 200. Thus, step 212 of the method 200 results in the subset $P_i$ of the set P of n measured surface points $\{P_1, P_2, \ldots, P_n\}$; the subset $P_i$ includes all measured surface points from the set P that were within the field of view of the image acquisition unit 22 at the time that it acquired the image $I_i$.

At step 214, the method 200 uses the subset $P_i$ of measured surface points within the field of view, the image positions of the pixels $p_1, p_2, \ldots, p_q$ in the current image $I_i$, and the image metadata for the current image $I_i$ to calculate colorized implied surface points for that image $I_i$. Each colorized implied surface point has a position in the Cartesian coordinate reference frame R, is associated with a corresponding pixel $p_j$ in the current image $I_i$ and has the color of its corresponding pixel $p_j$. The colorized implied surface points for the current image $I_i$ are added to the overall set CIP of colorized implied surface points.

At optional step 216, the method 200 assigns implied colors to at least some measured surface points in the subset $P_i$ of measured surface points to generate a set CMP of colorized measured surface points. The implied color assigned to each colorized measured surface point is determined from the colors of nearby colorized implied surface points, as described in greater detail below.

At step 218, the method 200 checks if there are more images to be handled. Responsive to a "yes" determination at step 218, the method 200 proceeds to step 220 to advance to the next image $I_{i+1}$ and then returns to step 214 to begin evaluating that next image $I_{i+1}$. Responsive to a "no" determination at step 218, indicating that there are no more images to be processed, the method 200 proceeds to step 222.

Accordingly, when the method 200 reaches step 222 following the last iteration of step 216, or following the last iteration of step 214 if step 220 is omitted, there are no more images to evaluate and the method 200 will have generated a plurality of colorized surface points. An individual colorized surface point is a location coordinate triplet (X, Y, Z) in the Cartesian coordinate reference frame R that is coupled with a color value. Where step 216 is included in the method 200, there will be two sets of colorized surface points: a set CIP of colorized implied surface points resulting from iterations of step 214 and a set CMP of colorized measured surface points resulting from iterations of step 216. If step 216 is omitted, there will only be a single set CIP of colorized implied surface points resulting from iterations of step 214. The combination of the sets CIP and CMP, or the combination of the set CIP and the original set P if step 216 is omitted, comprises a densified and colorized point cloud representation of the physical surface 14.

At optional step 222, the method 200 uses at least the set CIP of colorized implied surface points to form a three-dimensional, colored representation of the surface in the Cartesian reference frame R. Where optional step 216 is omitted from the method 200, step 222 uses only the set CIP of colorized implied surface points. In a preferred embodiment, the method 200 includes optional step 216 and step 222 uses both the set CIP of colorized implied surface points and the set CMP of colorized measured surface points form the three-dimensional, colored representation of the surface in the Cartesian coordinate reference frame R. Methods for forming a three-dimensional, colored representation of a surface in a Cartesian coordinate reference frame from a plurality of colored points are known in the art, and selection of an appropriate technique is within the capability of one skilled in the art.

If only a single image I is to be evaluated, i.e. the set I of images $\{I_1, I_2, \ldots, I_m\}$ consists of a single image I, steps 210, 218 and 2220 may be omitted and the method 200 may proceed from step 216 (or step 214 if step 216 is omitted) directly to step 222.

In the exemplary implementation, the method 200 indexes and assigns colors to the implied surface points on an image-by-image basis rather than indexing and colorizing the overall set of implied surface points. Although the latter approach may also be used in appropriate circumstances, the overall set of implied surface points can be arbitrarily large, and the computer memory required to index the overall set of implied surface points may exceed the available computer memory resources. In addition, the index search for the overall set of implied surface points will be relatively slow. Accordingly, it is preferred to index and colorize the implied surface points on an image-by-image basis.

Figure 3:
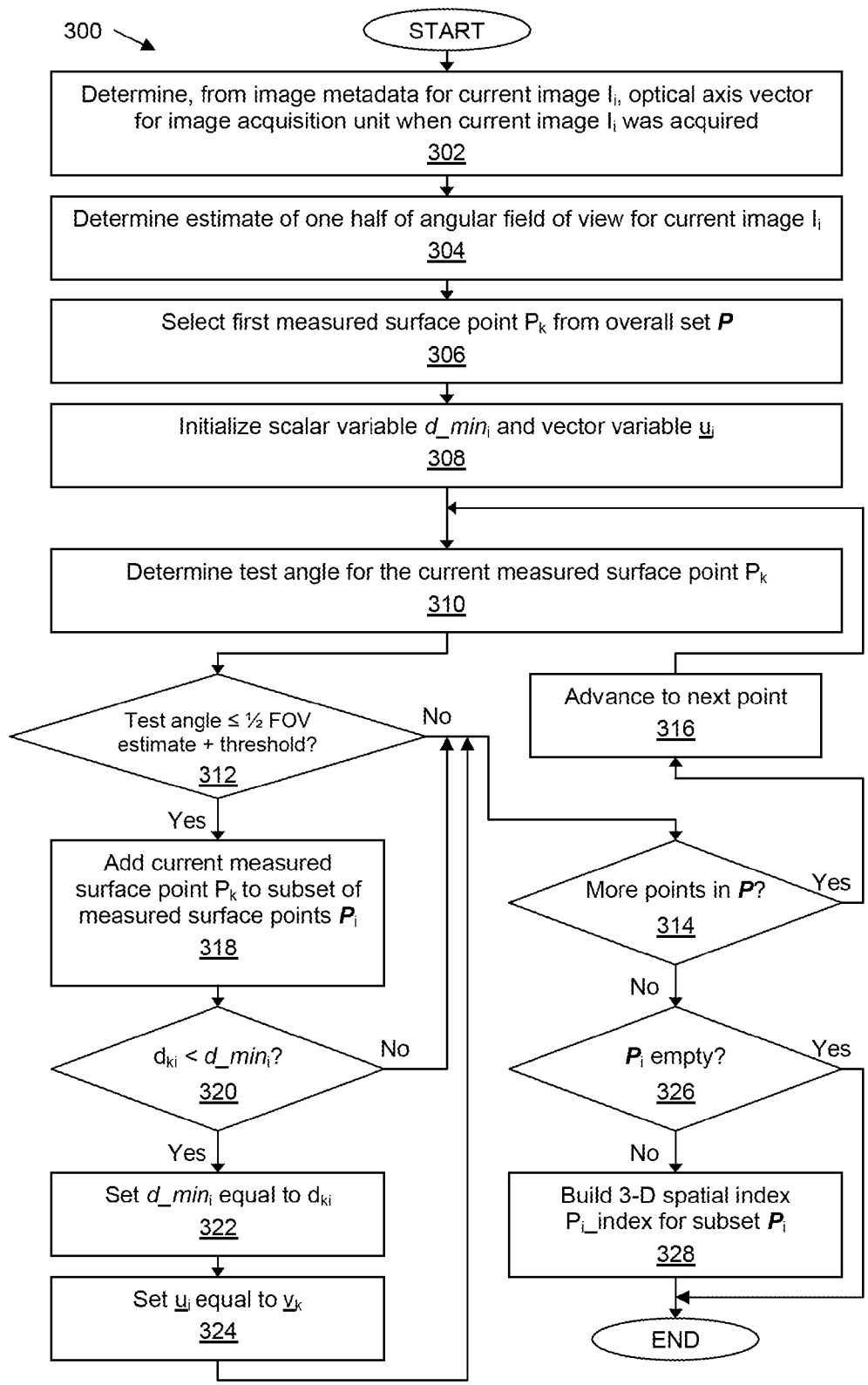
FIG. 3 is a flow chart showing an exemplary method 300 for isolating from a set P of n measured surface points $\{P_1, P_2, \ldots, P_n\}$ a subset $P_i$ of measured surface points comprising those measured surface points that are within the field of view of a given image $I_i$.

FIG. 3 is a flow chart showing a method 300 for isolating from the set P of n measured surface points $\{P_1, P_2, \ldots, P_n\}$ a subset $P_i$ of measured surface points comprising those measured surface points that are within the field of view of a given image $I_i$, as well as some additional measured surface points that are not in the field of view but whose inclusion in the subset $P_i$ will generally not affect the overall result of the method 200. As explained in more detail below, the exemplary method 300 sacrifices precision (by including in the subset $P_i$ some measured surface points that are not in the field of view) for increased processing efficiency. The method 300 is an exemplary implementation of block 212 of the method 200 shown in FIG. 2. In addition to isolating the subset $P_i$ from the overall set P of measured surface points $\{P_1, P_2, \ldots, P_n\}$, the method 300 also performs other operations to produce output that facilitates subsequent processing.

The inputs utilized by the exemplary method 300 are:
the overall set P of n measured surface points $\{P_1, P_2, \ldots P_n\}$;
the current image $I_i$; and
the image metadata for the current image $I_i$, which includes an estimate of the position and orientation of the image acquisition unit 22 at the time the image $I_i$ was acquired as well as calibration parameters for the image acquisition unit 22.

The variables used in implementing the exemplary method 300 for each image $I_i$ are:
a (sub)set $P_i$ of measured surface points;
scalar variables $d\_min_i$ and d; and
vector variable $u_i$.

The (sub)set $P_i$ is initially empty when the method 300 begins, and when the method 300 is complete the (sub)set $P_i$ will contain measured surface points from the overall set P including those measured surface points that are within the field of view of a given image $I_i$. and will hence be a subset of the overall set P. The variable d is used to store the distance $d_{ki}$ between the current measured surface point $P_k$ and the estimated focal point $FP_i$ of the image acquisition unit 22 when the image $I_i$ was acquired. Upon completion of the method 300, $d\_min_i$ will have been evaluated to the distance between the estimated focal point $FP_i$ and the closest measured surface point $P_k$ that is within the field of view of the current image $I_i$, and $u_i$ will have been evaluated to the vector that that points from the estimated focal point $FP_i$ to that closest measured surface point $P_k$.

The method 300 also makes use of spatial indexing functions for creating a three-dimensional spatial index that, for a specified location in the Cartesian coordinate reference frame R, returns the exact or approximate n closest elements to that location from a set of indexed points in the Cartesian coordinate reference frame R. As indicated above, suitable spatial indexing functions are well-known in the art and selection thereof is within the capability of one skilled in the art, now informed by the herein disclosure. For example, and without limitation, the FLANN implementation of the randomized kd-tree index, which is available online at http://people.cs.ubc.ca/~mariusm/index.php/FLANN/FLANN, may be used.

At step 302, the method 300 determines, from the image metadata for the current image $I_i$, an optical axis vector for the image acquisition unit 22 when that image was acquired. An estimated optical axis vector for a given image $I_i$ may be determined by using the associated image metadata to compute the positioned unit vector o in the Cartesian coordinate reference frame R such that the tail of the positioned unit vector o is located at the estimated position of the focal point $FP_i$ in the Cartesian coordinate reference frame R of the image acquisition unit 22 when the image $I_i$ was acquired and its direction is towards the scene imaged by the image $I_i$ along the estimated optical axis when the image $I_i$ was acquired. The positioned unit vector o will be the optical axis vector.

At step 304, the method 300 determines an estimate of one half of the angular field of view for the current image $I_i$. The estimate for one half of the angular field of view of the image acquisition unit 22 for the current image $I_i$ may be obtained by finding the maximum angle half_fov between the optical axis vector, that is, the positioned unit vector o, and any positioned sightline vector $s_j$ of the image $I_i$; this will be the angle between the positioned unit vector o and the positioned sightline vector $s_j$ of one of the corner pixels in the current image $I_i$.

At step 306, the method 300 selects a first measured surface point $P_k$ from the overall set P of measured surface points $\{P_1, P_2, \ldots, P_n\}$. Similarly to step 210, step 306 is an initialization step that cooperates with subsequent steps in the method 300 to ensure that the entire set P of measured surface points $\{P_1, P_2, \ldots, P_n\}$ is evaluated. The method 300 then proceeds to step 308.

At step 308, the method 300 initializes the variables that will be used to identify the point in the subset of measured surface points $P_i$ that is closest to the estimated focal point $FP_i$ of the image acquisition unit 22 when the image $I_i$ was acquired. Specifically, at step 308 the method initializes the scalar variable d_min$_i$ and the vector variable Initialization of the variable d_min$_i$ may be achieved by setting d_min$_i$ equal to $d_{ki}$, i.e. the distance between the current measured surface point $P_k$ and the estimated focal point $FP_i$. Similarly, the variable $u_i$ can be initialized by setting $u_i$ to the vector $v_k$ that points to that measured surface point $P_k$ from the estimated location of the focal point $FP_i$.

At step 310, the method 300 determines a test angle for the current measured surface point $P_k$. The test angle is the angle between (a) the estimated optical axis and (b) a line extending between the current measured surface point $P_k$ and the estimated focal point $FP_i$ of the image acquisition unit 22 when the image $I_i$ was acquired. Thus, for the current measured surface point $P_{ki}$ the method 300 can determine the angle test_ang$_k$ between the positioned unit vector o (the optical axis vector) and the vector $v_k$ that points to that measured surface point $P_k$ from the estimated location of the focal point $FP_i$.

At step 312, the method 300 compares the test angle to the estimated half of the angular field of view (FOV) for the image $I_i$ to determine whether the test angle test_ang$_k$ exceeds the estimated half of the angular field of view for that image by more than a test angle threshold. Thus, method 300 compares the angle test_ang$_k$ between the vectors o and $v_k$ to the angle half_fov estimating one half the field of view for the image $I_i$.

If the method 300 determines at step 312 that the test angle test_ang$_k$ exceeds the estimated half of the angular field of view for the image $I_i$ by more than the test angle threshold ("no" at step 312), i.e. the test angle test_ang$_k$ is greater than the sum of the angle half_fov and the test angle threshold, this indicates that the current measured surface point $P_k$ is not in the field of view for the current image $I_i$ and the method 300 will not include the corresponding measured surface point $P_k$ in the subset of measured surface points $P_i$ comprising those measured surface points that are within the field of view of that image $I_i$. Accordingly, the current measured surface point $P_k$ is not copied to the subset of measured surface points $P_i$ and the method then proceeds to step 314.

At step 314, the method 300 checks if there are any more points in the overall set P of measured surface points $\{P_1, P_2, \ldots, P_n\}$ to be evaluated. If there are more points ("yes" at step 314), the method 300 proceeds to step 316 to index to the next point $P_{k+1}$ and then returns to step 310 to begin evaluating that next point $P_{k+1}$. If there are no more points in the overall set P of measured surface points $\{P_1, P_2, \ldots, P_n\}$ to be evaluated, the method 300 proceeds to step 326 as described further below.

In response to a determination at step 312 that test angle test_ang$_k$ does not exceed the estimated half of the angular field of view for the image $I_i$ by more than the test angle threshold ("yes" at step 312), i.e. a determination that the test angle test_ang$_k$ between the vectors o and $v_k$ is less than or equal to the sum of the angle half_fov and the test angle threshold, the method 300 proceeds to step 318. At step 318, the method 300 adds the current measured surface point $P_k$ to the subset of measured surface points $P_i$ comprising those measured surface points that are within the field of view of that image $I_i$ and then proceeds to step 320.

The use of a non-zero test angle threshold allows the method 300, and in particular the test carried out at step 312, to avoid incorrectly rejecting a measured surface point $P_k$ whose test angle test_ang$_k$ is slightly greater than the angle half_fov estimating half of the angular field of view for the image $I_i$ but which is still within the field of view for the image $I_i$. These types of measured surface points will typically be those that are visible in the extreme corners of the image $I_i$. Thus, the use of a non-zero test angle threshold provides for a safety margin against inaccuracy in the geometric image metadata. The precise value of the test angle threshold will depend on the particular image acquisition unit 22; calculation of a suitable test angle threshold for a given image acquisition unit 22 is within the capability of one skilled in the art, now informed by the herein disclosure.

Alternatively, the test angle threshold may be zero, so that step 312 will simply test whether the test angle test_ang$_k$ is less than or equal to the angle half_fov estimating half of the angular field of view for that image. In such an embodiment, responsive to a determination at step 312 that the test angle half_fov is less than or equal to half_fov for that image, the method 300 proceeds to step 318 to add the current measured surface point $P_k$ to the subset of measured surface points P, comprising those measured surface points that are within the field of view of that image $I_i$ and then proceeds to step 320, whereas responsive to a determination at step 312 that the test angle half_fov exceeds half_fov for that image, the method 300 proceeds to step 314.

At step 320, the method 300 tests whether d (which holds the distance $d_{ki}$ between the current measured surface point $P_k$ and the estimated focal point $FP_i$ for the current image $I_i$) is less than d_min$_i$ (the minimum distance between the estimated focal point $FP_i$ any measured surface point $P_k$ that is within the field of view of the current image $I_i$). If the method 300 determines at step 320 that d is not less than d_min$_i$ then the method 300 proceeds to step 314 to check whether there are further points in the overall set P of measured surface points $\{P_1, P_2, \ldots, P_n\}$ to be evaluated.

If the method 300 determines at step 320 that $d_{ki}$ (the distance between the current measured surface point $P_k$ and the estimated focal point $FP_i$ for the current image $I_i$) is less than d_min$_i$, the method proceeds to step 322 to set d_min$_i$ equal to $d_{ki}$ and then to step 324 to set a equal to $v_k$; steps 322 and 324 may also be carried out in reverse order. After executing steps 322 and 324, the method 300 proceeds to step 314 to determine if there are additional points in the overall set P of measured surface points $\{P_1, P_2, \ldots, P_n\}$ that have not yet been evaluated and, if so, proceeds to step 316 to index to the next point $P_{k+1}$ and then returns to step 310 to begin evaluating that next point $P_{k+1}$.

If the method 300 determines at step 314 that all of the measured surface points in the overall set P of measured surface points $\{P_1, P_2, \ldots, P_n\}$ have been evaluated (a "no" at step 314) the method 300 proceeds to step 326 to check whether the subset of measured surface points $P_i$ is empty (i.e. there are no measured surface points in the overall set P of measured surface points $\{P_1, P_2, \ldots, P_n\}$ that are within the field of view of the image $I_i$). If the subset $P_i$ is empty ("yes" at step 326), the method 300 ends; if the subset $P_i$ is not empty ("no" at step 326), the method proceeds to step 328.

At step 328, the method 300 uses spatial indexing functions to build a three-dimensional spatial index $P_{i\_}$index for the subset $P_i$ that will return the exact or approximate n nearest elements of the subset of measured surface points P, closest to a specified location in the Cartesian coordinate reference frame R. After step 328, the method 300 ends.

The output from the method 300 includes:
The subset $P_i$ of the overall set P of measured surface points $\{P_1, P_2 \ldots P_n\}$
The spatial index $P_{i\_}$index;
The scalar $d\_min_i$;
The vector $u_i$:

The subset $P_i$ includes all those measured surface points that are within the field of view of the image acquisition unit 22 when it acquired the image $I_i$. the set of measured surface points $P_i$ is a subset of the overall set of n measured surface points The subset $P_i$ may also contain some points that are just outside that field of view, because half_fov is only an approximation of the half angular field of view of the image acquisition unit 22. As explained in more detail in the discussion of step 408 of the method 400, in the illustrated embodiment those measured surface points that are not within the field of view of the image $I_i$ will generally not be involved in the calculation of implied surface points (step 214 of the method 200). Accordingly, the inclusion in the subset $P_i$ of measured surface points that are not within the field of view of the image $I_i$ does not materially affect the outcome of the overall method 200. While the exemplary method 300 includes some extraneous points in the subset $P_1$, it is a rapid and straightforward method as compared to a method that would include only points that were actually within the field of view of the image $I_i$. Although the extraneous points must be indexed (step 328), it is believed that the additional time and processing resources associated with indexing the extraneous points is significantly less than the additional time and processing resources that would be required for a method that determines exactly those points that are within the field of view of the image $I_i$. Optionally, a method that determines exactly those points that are within the field of view of the image $I_i$ may be used instead of the exemplary method 300.

The spatial index $P_{i\_}$index returns the exact or approximate n closest elements of the set of measured surface points $P_i$ to a specified location in the Cartesian coordinate reference frame R.

Following completion of the method 300 for a given image $I_i$, $d\_min_i$ will have been evaluated to the smallest distance between any point in the set of measured surface points P, and the focal point $FP_i$ of the image acquisition unit 22 when the image $I_i$ was acquired, and $u_i$. will have been evaluated to the vector that points from the focal point $FP_i$ to the point in the subset $P_i$ of measured surface points that is closest to that focal point $FP_i$.

An alternate method for implementing block 212 of the method 200 shown in FIG. 2 would be to project the position of the current measured surface point onto the image plane and test whether this projected position falls within the image extent on the image plane. However, this alternate method is expected to be significantly slower than the exemplary method 300 and hence the exemplary method 300 is presently preferred.

Figure 4:
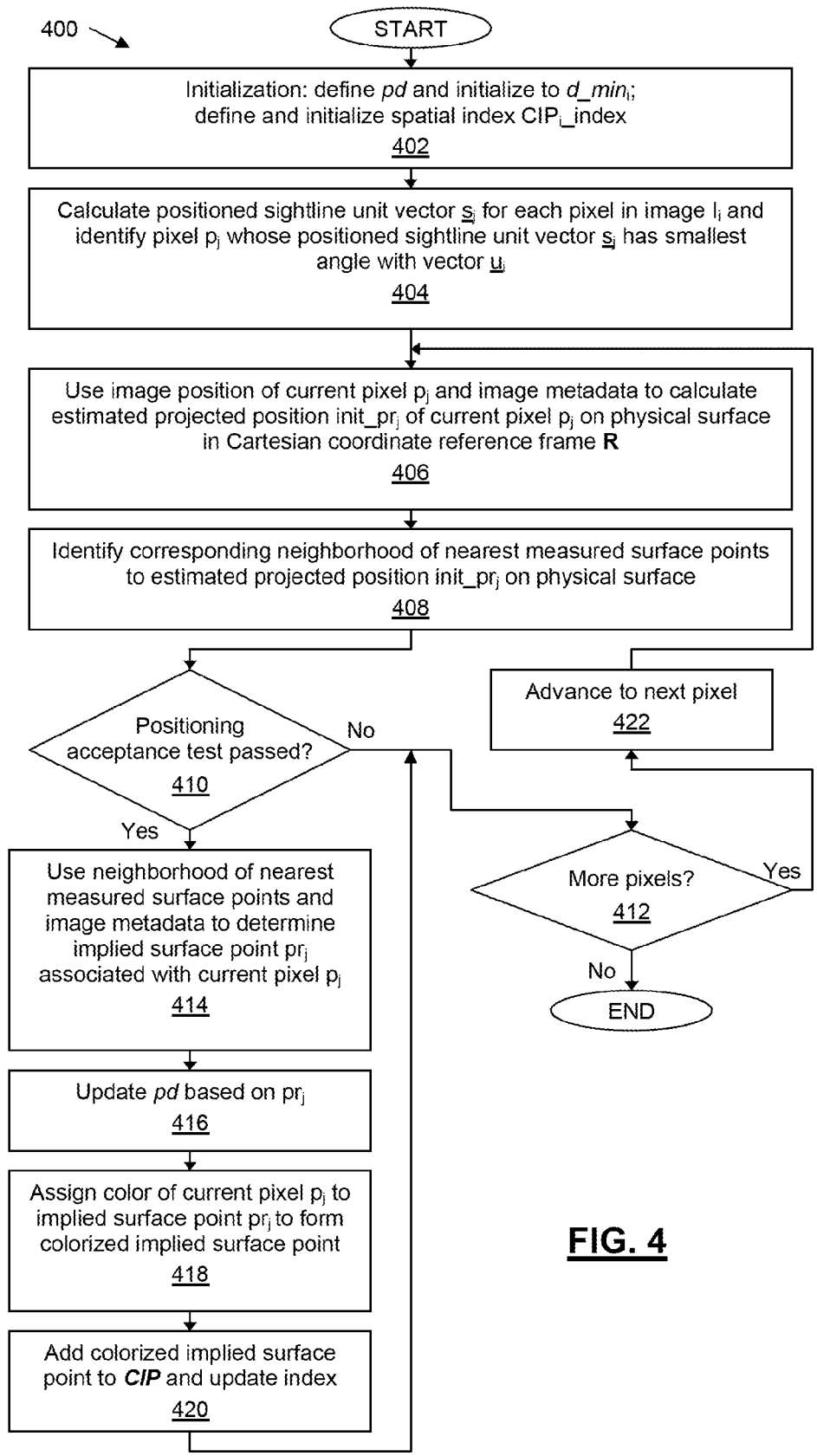
FIG. 4 is a flow chart illustrating an exemplary method for using image positions of the pixels $p_1 p_2, \ldots p_q$ in an image $I_i$, a subset $P_i$ of measured surface points in the field of view of that image $I_i$ and image metadata associated with that image $I_i$ to calculate colorized implied surface points.

Reference is now made to FIG. 4, which is a flow chart illustrating an exemplary method 400 for implementing block 214 of the method 200. Thus, the method 400 is an exemplary method for using the image positions of the pixels $p_1$, $p_2, \ldots, p_q$ in an image $I_i$, the subset $P_i$ of measured surface points in the field of view of that image $I_i$ and the image metadata associated with that image $I_i$ to calculate colorized implied surface points. The method 400 results in updating of the overall set CIP of colorized implied surface points with the colorized implied surface points for the current image $I_i$. The method 400 also updates a spatial index for the elements of the overall set CIP of colorized implied surface points CIP. As explained in more detail below, in the exemplary embodiment a colorized implied surface point may be formed by coupling color of a pixel with the location of the projection of a pixel location onto the physical surface represented by set P of measured surface points $\{P_1, P_2, \ldots P_n P_n\}$.

The exemplary method 400 uses the following inputs:
The set of colorized implied surface points CIP (which will be empty on the first iteration of the method 400);
The current image $I_i$;
The image metadata for the current image $I_i$, which includes an estimate of the position and orientation of the image acquisition unit 22 at the time the image $I_i$ was acquired as well as calibration parameters of the image acquisition unit 22;
The set $P_i$ of measured surface points that includes all those are within the field of view of the image acquisition unit when it acquired the image $I_i$;
The spatial index $P_{i\_}$index output by the method 300;
The scalar $d\_min_i$; and
The vector $u_i$.

The method 400 also uses spatial indexing functions for creating a three-dimensional spatial index returning the exact or approximate n closest elements to a given location. As stated above, such functions are known and selection thereof is within the capability of one skilled in the art.

At step 402, the method 400 executes an initialization procedure. The method 400 defines a scalar variable pd, which will serve as an initial estimate of the projection distance for the pixel $p_j$, and initializes it by setting it to $d\_min_j$ as determined by the method 300. The method 400 also and uses suitable spatial index functions to define and initialize a spatial index $CIP_{i\_}$index for the colorized implied surface points that will be added to the set CIP of colorized implied surface points during the iteration of the method 400 for the current image L. The method then proceeds to step 404.

At step 404, the method 400 calculates positioned sightline unit vector $s_j$ for each pixel $p_j$ in the image $I_i$ and identifies the pixel $p_j$ in the image $I_i$ whose positioned sightline unit vector $s_j$ has the smallest angle with $u_i$ (the unit vector that points from the focal point $FP_i$ to the point in the subset $P_i$ of measured surface points that is closest to that focal point $FP_i$) for that image $I_i$. As explained above, for a given pixel $p_j$ the positioned sightline unit vector $s_j$ has its tail at the estimated position of the focal point $FP_i$ of the image acquisition unit 22 when the image $I_i$ was acquired and its direction is the estimated direction of the vector from the centre of the image acquisition unit 22 for pixel $p_j$ and through the focal point $FP_i$ when the image $I_i$ was acquired. The positioned sightline unit vector $s_j$ is derived from the pixel position and the image metadata for the image $I_i$. Determination of the pixel $p_j$ in the image $I_i$ whose positioned sightline unit vector $s_j$ that has the smallest angle with $u_i$ may be carried out using any suitable technique, such as by using the initial pixel $p_j$ to initialize a variable for the minimum value of the angle and then, for each subsequent pixel $p_j$, calculating and comparing the angle for that pixel to the then-current minimum and updating as required.

The pixel $p_j$ in the image $I_i$ whose positioned sightline unit vector $s_j$ has the smallest angle with $u_i$ will be the first pixel to be evaluated for whether to create a corresponding implied surface point. The point viewed by this pixel $p_j$ will be the closest point on the physical surface 14 to the measured surface point that is closest to the optical axis for the image $I_i$, and hence will provide a good distance-pixel match. Subsequent pixels will be evaluated by working outwardly from this pixel.

The method 400 then proceeds from step 404 to step 406. Steps 406 to 416 may be considered a sub-procedure which, for a given pixel $p_j$, determines whether a colorized implied surface point is to be generated for that pixel $p_j$ and, if so, calculates a location $pr_j$ for that colorized implied surface point. The inputs utilized by the sub-procedure comprising steps 406 to 418 are the following:
  a pixel $p_j$ from the current image $I_i$;
  the image metadata for the current image $I_i$;
  scalar variables pd, t and (integer) nsf,
  the subset $P_i$ of measured surface points that includes all those are within the field of view of the image acquisition unit 22 when it acquired the image and
  the spatial index $P_{i\_}$index output from the method 300;

The scalar variable pd is used as an initial estimate of the projection distance for a given pixel $p_j$. The projection distance for a pixel $p_j$ is the distance between the surface location pictured by that pixel $p_j$ and the focal point $FP_i$ at the instant that the image $I_i$ was acquired. The scalar variable t is used as a positioning distance threshold, and is chosen to be a reasonable upper limit on the distance between adjacent measured points on the same continuous surface. The variable nsf holds the number of points that are required as input by the three-dimensional surface fitting function that is applied in step 414.

As noted above, the spatial index $P_{i\_}$index output from the method 300 is a spatial index that returns the exact or approximate n nearest elements of the set $P_i$ of measured surface points closest to a specified location in Cartesian coordinate reference frame R.

The sub-procedure comprising steps 406 to 418 also makes use of spatial indexing functions for creating a three-dimensional spatial index that returns the closest elements to that location from a set of indexed points in the Cartesian coordinate reference frame R as well as a three-dimensional surface fitting function. As noted above, suitable spatial indexing functions and three-dimensional surface-fitting functions are well-known in the art and selection thereof is within the capability of one skilled in the art, now informed by the herein disclosure. For example, the FLANN implementation of the randomized kd-tree index, noted above, may be used for spatial indexing.

At step 406, the method 400 uses the image position of the current pixel $p_j$ and the image metadata associated with the current image $I_i$, to calculate an estimated projected position $init\_pr_j$ of that pixel $p_j$ on the physical surface 14 in the Cartesian coordinate reference R. In the illustrated embodiment, at step 406 the method 400 multiplies the positioned sightline unit vector $s_j$ for the pixel for $p_j$ by pd to obtain the estimated projected position $init\_pr_j$ for the pixel for $p_j$. The method 400 then proceeds to step 408.

At step 408, the method 400 identifies a corresponding neighborhood of nearest measured surface points to the estimated projected position $init\_pr_j$ of the pixel $p_j$ on the physical surface 14 in the Cartesian coordinate reference frame R. In the illustrated embodiment, at step 408 the method 400 uses $P_{i\_}$index, which returns the exact or approximate n closest elements of the set $P_i$ of measured surface points to a specified location in the Cartesian coordinate reference frame R, as well as suitable functions for applying a three-dimensional spatial index. Step 408 identifies, within the subset $P_i$ of measured surface points within the field of view of the image $I_i$, the nsf nearest-neighbors of the estimated projected position $init\_pr_j$ of the current pixel $p_j$, with nsf being the number of points that are required as input by the three-dimensional surface fitting function that is applied in step 414. The method 400 then proceeds to step 410.

As noted above, the subset $P_i$ generated by the exemplary method 300 may include some measured surface points that are not actually within the field of view of the corresponding image $I_i$ currently being handled. In general, for any given pixel $p_j$, in an image $I_i$, measured surface points that are not within the field of view of that image $I_i$ will not form part of the neighborhood of nearest measured surface points to the estimated projected position $init\_pr_j$ of that pixel $p_j$ identified at step 408. Therefore, measured surface points that are not within the field of view of that image $I_i$ will generally not be included in the operations based on that neighborhood. As a result, the inclusion in the subset $P_i$ of some measured surface points that are not actually within the field of view of the image $I_i$ will generally not affect the calculation of implied surface points by the method 400.

At step 410, the method 400 applies a positioning acceptance test to the neighborhood of nearest measured surface points identified at step 408. In one embodiment, the positioning acceptance test comprises testing whether any measured surface points in the neighborhood of nearest measured surface points determined at step 408 are further away from the estimated projected position $init\_pr_j$ of the current pixel $p_j$ than a positioning distance threshold t. If the acceptance test determines that at least one measured surface point in the neighborhood of nearest measured surface points is further away from the estimated projected position $init\_pr_j$ of the current pixel $p_j$ than the positioning distance threshold t, this results in the neighborhood of nearest measured surface points failing the positioning acceptance test. Conversely, a determination that none of the measured surface points in the neighborhood of nearest measured surface points are further away from the estimated projected position $init\_pr_j$ of the current pixel $p_j$ than the positioning distance threshold t results in the neighborhood of nearest measured surface passing the positioning acceptance test.

If the neighborhood of nearest measured surface points identified at step 408 fails the positioning acceptance test ("no" at step 410), the value of the initial projection estimate pd remains unchanged, and the method 400 proceeds to step 412 to see if there are more pixels to evaluate. Thus, where the neighborhood of nearest measured surface points identified for a given pixel $p_j$ fails the positioning acceptance test, the method 400 does not determine any implied surface point associated with that pixel $p_j$.

Responsive to a determination that the neighborhood of nearest measured surface points for the current pixel $p_j$ passes the positioning acceptance test ("yes" at step 410), the method 400 proceeds to step 414. At step 414, the method 400 uses the neighborhood of nearest measured surface points for the current pixel $p_j$ and the image metadata associated with the current image to determine an implied surface point $pr_j$ associated with the current pixel $p_j$. The method 400 then proceeds to step 416, where the method 400 updates the value of pd based on the implied surface point $pr_j$ determined at step 414.

The outputs from the sub-procedure comprising steps 406 to 416 are the following:

an implied surface point $pr_j$ if the positioning acceptance test at step 410 is passed—if the positioning acceptance test at step 410 is failed the relevant variable is set to NONE; and the variable pd.

If the positioning acceptance test at step 410 is passed, the variable pd is a refined estimated projection distance for the pixel $p_j$ whereas if the positioning acceptance test at step 410 is failed, the value of pd remains the value of pd that was used as input into that iteration of the sub-procedure comprising steps 406 to 416.

After executing step 416 and thus completing the sub-procedure comprising steps 406 to 416 for a case where an implied surface point $pr_j$ is found, the method 400 proceeds to step 418 where the method 400 assigns the color of the current pixel $p_j$ to the implied surface point $pr_j$ and thereby forms a colorized implied surface point. Optionally, step 418 may be carried out before step 416. After generating the colorized implied surface point at step 418, the method 400 proceeds to step 420 where it adds the colorized implied surface point to the set CIP and updates the spatial index $CIP_{i\_index}$, and then moves to step 412 to check whether there are further pixels to be evaluated.

Figure 4A:
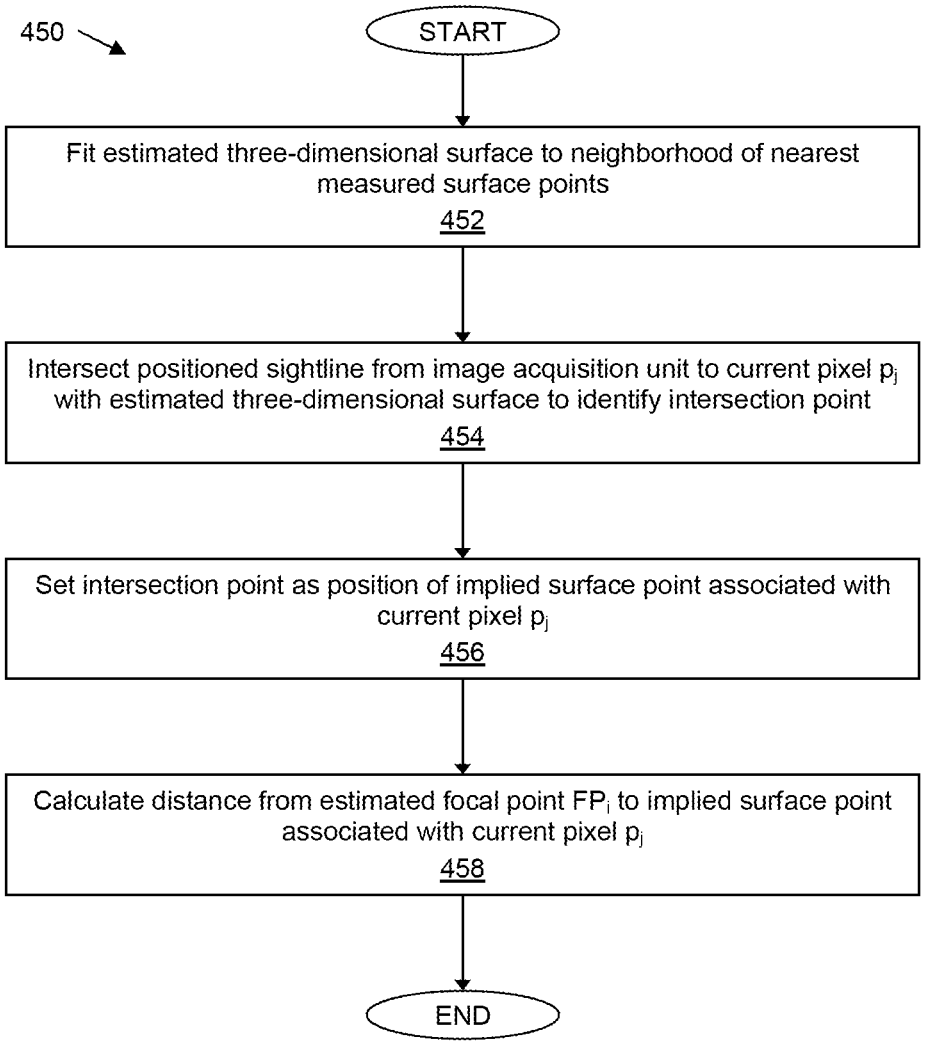
FIG. 4A is a flow chart showing an exemplary method for using a neighborhood of nearest measured surface points for a current pixel $p_j$ and image metadata associated with a current image $I_i$ to determine an implied surface point associated with the current pixel $p_j$.

Reference is now made to FIG. 4A, which is a flow chart showing an exemplary method 450 by which step 414 may be implemented; thus, the method 450 is an exemplary method for using the neighborhood of nearest measured surface points for the current pixel $p_j$ and the image metadata associated with the current image $I_i$ to determine an implied surface point associated with the current pixel $p_j$. As will be recalled, at commencement of step 414 in FIG. 4, and hence at commencement of the method 450 in FIG. 4A, the neighborhood of nearest measured surface points for the current pixel $p_j$ passes the positioning acceptance test.

At step 452, the method 450 fits an estimated three-dimensional surface to the neighborhood of nearest measured surface points determined at step 408, and then proceeds to step 454. Any suitable three-dimensional surface-fitting algorithm may be used at step 450; such algorithms are well-known in the computer-programming arts and selection of a suitable such algorithm is within the capability of one skilled in the art, now informed by the herein disclosure. For example, a planar fit to the three nearest measured surface points may be used.

At step 454, the method 400 takes a positioned sightline from the image acquisition unit 22 to the current pixel $p_j$ and intersects that sightline with the estimated three-dimensional surface to identify the intersection point. The positioned sightline is calculated using the image position of the current pixel $p_j$ and the image metadata for the current image $I_i$. For example, the positioned sightline unit vector $s_j$ for the current pixel $p_j$ can be extended until it intersects the estimated three-dimensional surface fitted at step 454. Next, the method 450 proceeds to step 456.

At step 456, the method 400 sets the intersection point determined at step 454 as the position of the implied surface point associated with the current pixel $p_j$. The method then moves to step 458, where the method 400 calculates the distance from the estimated focal point $FP_i$ to the implied surface point associated with the current pixel $p_j$ (i.e. the intersection point determined at step 454). This distance is used to update pd at step 416 of the method 400. Steps 456 and 458 may be performed in reverse order, or substantially simultaneously, and after steps 456 and 548 are complete, the method 452 ends and as such the method 400 in FIG. 4 proceeds from step 414 to step 416.

Now returning to FIG. 4, where the method 400 determines at step 412 that there are additional pixels to evaluate, the method proceeds to step 422 to advance to the next pixel. After advancing to the pixel at step 422, the method 400 then returns to step 406 to calculate the estimated projected position of that next pixel.

In a preferred embodiment, advancing to the next pixel begins by working outward from the initial pixel determined at step 404, so that each subsequent pixel examined is always adjacent to the previously examined pixel. Accordingly, the value of pd that is used to determine the estimated projected position $init\_pr_{j+1}$ of the next pixel $p_{j+1}$ will be the value pd (whether updated or not) from an adjacent pixel. The first pixel $p_j$ to be evaluated, as determined at step 404, has image (row, column) coordinates $(r_j, c_j)$, and the image $I_i$ of which the pixel $p_j$ forms a part has row and column dimensions of R and C, respectively, and row and column coordinate ranges [1 . . . R] and [1 . . . C] respectively. Step 422 first executes after the first pixel $p_j$ has been evaluated, and indexes to an adjacent pixel $p_{j+1}$.

In one exemplary embodiment, after the method 400 has dealt with the first pixel $p_j$ to be evaluated, which has image coordinates $(r_j, c_j)$, step 422 first indexes to the pixel with image coordinates $(r_j, c_j+1)$. After the pixel with image coordinates $(r_j, c_j+1)$ has been evaluated, on subsequent iterations step 400 will index to the pixel with image coordinates $(r_j, c_j+2)$, then to the pixel with image coordinates $(r_j, c_j+3)$ and so on up to the pixel with image coordinates $(r_j, C)$, after which step 422 will reset the value of pd to the value of pd that was returned from the evaluation of the pixel having image coordinates $(r_j, c_j)$ (which may be a calculated value or may be $d\_min_i$). On the next iteration step 422 sets the next pixel to be evaluated to be the pixel with image coordinates $(r_j, c_j-1)$, then on subsequent iterations step 422 indexes to the pixel with image coordinates $(r_j, c_j-2)$, then to the pixel with image coordinates $(r_j, c_j-3)$ and so on down to the pixel with image coordinates $(r_j, 1)$, after which the value of pd is again reset to the value of pd that was returned from the evaluation of the pixel having image coordinates $(r_j, c_j)$. At this stage, the entire row that included the first pixel $p_j$ has been evaluated.

On the next iteration, step 422 will index to the pixel having image coordinates $(r_j-1, c_j)$, and on subsequent iterations will repeat the above process for the row immediately above the row containing the first pixel $p_j$. Thus, during further iterations step 422 will index to the pixel with image coordinates $(r_j-1, c_j+1)$, then to the pixel with image coordinates $(r_j-1, c_j+2)$, then to the pixel with image coordinates $(r_j-1, c_j+3)$ and so on up to the pixel with image coordinates $(r_j-1, C)$ after which step 422 will reset the value of pd to the value of pd that was returned from the evaluation of the pixel having image coordinates $(r_j-1, c_j)$. On the next iteration step 422 moves to the pixel with image coordinates $(r_j-1, c_j-1)$, then on subsequent iterations to the pixel with image coordinates $(r_j-1, c_j-2)$, then to the pixel with image coordinates $(r_j-1, c_j-3)$ and so on up to the pixel with image coordinates $(r_j-1, 1)$, completing evaluation of the pixels in the row immediately above the row containing the first pixel $p_j$ at which point step 422 again resets the value of pd to the value of pd that was returned from the evaluation of the pixel having image coordinates $(r_j-1, c_j)$. On subsequent iterations step 422 will move to the next row above and repeat the foregoing process until all of the rows above the row containing the first pixel $p_j$ have been evaluated. Step 422 resets the value of pd to the value of pd that was returned for the starting pixel (i.e. the pixel in column $c_j$) in the current row before moving to the next row, so that evaluation of the starting pixel in the next row will use a value of pd from an adjacent pixel. Thus, evaluation of the pixel having image coordinates $(r_j-1, c_j)$ uses the pd value from the pixel having image coordinates $(r_j, c_j)$, evaluation of the pixel having image coordinates $(r_j-2, c_j)$ uses the pd value from the pixel having image coordinates $(r_j-1, c_j)$, evaluation of the pixel having image coordinates $(r_j-3, c_j)$ uses the pd value from the pixel having image coordinates $(r_j-2, c_j)$, and so on. Thus, each time step 422 advances to a new row, the starting pixel in that row is evaluated using the pd value from the adjacent pixel (i.e. the pixel in the same column) in the preceding row.

After all of the rows above the row containing the first pixel $p_j$ have been evaluated, step 422 resets pd to the value of pd that was returned from the evaluation of the pixel having image coordinates $(r_j, c_j)$, and then moves to the pixel having image coordinates $(r_j+1, c_j)$ and carries out a corresponding process for the rows below the row containing the first pixel $p_j$. Each time the end of a row is reached, the value of pd is reset to the value of pd that was returned for the starting pixel (i.e. the pixel in column $c_j$) in the current row before moving to the other side of the row or to the adjacent starting pixel in the next row. The process continues until step 422 completes evaluation of the row containing the pixel having image coordinates $(R, c_j)$, at which point all rows, and hence all columns, of the image $I_i$ will have been evaluated. Thus, in the exemplary embodiment described above, the indexing procedure at step 422 evaluates the row containing the starting pixel $p_j$ having image coordinates $(r_j, c_j)$, then the rows above, and then the rows below, with evaluation of each row moving, from the starting pixel for that row, first from left to right and then from right to left.

The implementation of step 422 described above is exemplary only, and other techniques may be used for indexing to adjacent pixels. For example, rows may be evaluated first from right to left and then from left to right, or step 422 could, after evaluating the initial pixel $p_j$ having image coordinates $(r_j, c_j)$, proceed to the row below that pixel instead of the row above, and evaluate the rows above after reaching the bottom of the image $I_i$. Alternatively, an analogous column-wise evaluation may be used instead of the row-wise evaluation described above.

Following a determination at step 412 that there are no more pixels to evaluate (i.e. all of the pixels in the current image $I_i$ have been evaluated) the method 400 ends. Since the exemplary method 400 is an implementation of step 214 of the method 200 in FIG. 2, the method 200 would then proceed to step 216 to see if there are further images to evaluate.

The exemplary method 400 generates the following output:
The set CIP of colorized implied surface points; and
The spatial index $CIP_{i\_}$index.

The set CIP of colorized implied surface points will be the input set CIP of colorized implied surface points that has been updated by the current iteration of the method 400 with the colorized implied surface points determined for the image $I_i$ evaluated by that iteration of the method 400. The spatial index $CIP_{i\_}$index is a spatial index that returns the exact or approximate n nearest elements of the colorized implied surface points generated from image $I_i$ (which is a subset of the overall set CIP of colorized implied surface points) to a specified location in the Cartesian coordinate reference frame R.

As indicated above in describing FIG. 2, after all images in the set I have been evaluated, at step 222 the method 200 uses at least the set CIP of colorized implied surface points to form a three-dimensional, colored representation of the surface in the Cartesian coordinate reference frame R. As also stated above, the method 200 preferably includes optional step 220 at which the method 200 assigns implied colors to at least some measured surface points in the overall set P of measured surface points to generate a set CMP of colorized measured surface points, and step 222 preferably uses both the set CIP of colorized implied surface points and the set CMP of colorized measured surface points form the three-dimensional, colored representation of the surface.

Figure 5:
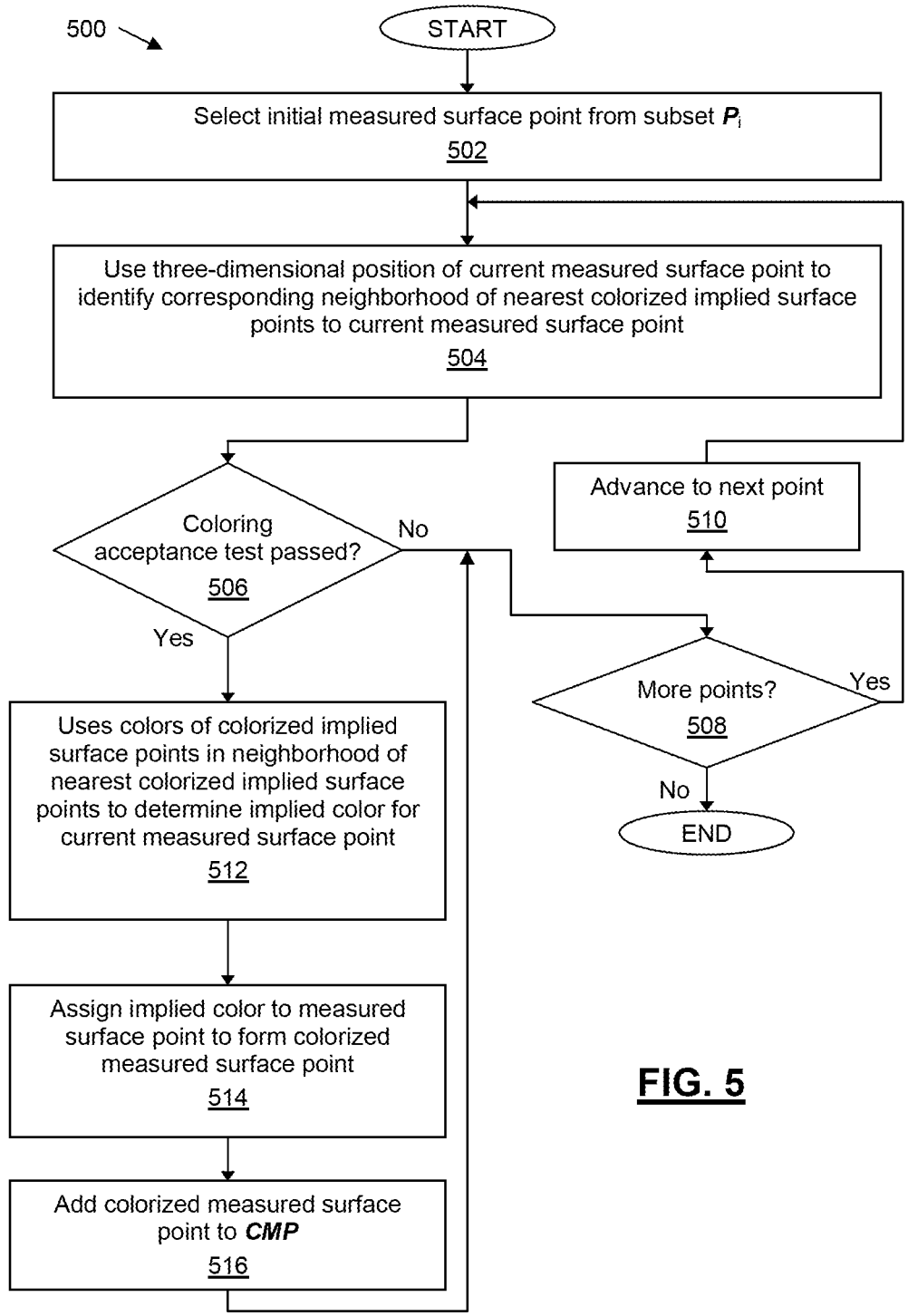
FIG. 5 is a flow chart showing an exemplary method for assigning implied colors to at least some measured surface points in a set P of measured surface points.

Reference is now made to FIG. 5, which is a flow chart showing an exemplary method 500 for assigning implied colors to at least some measured surface points in the overall set P of measured surface points so as to generate the set CMP of colorized measured surface points. Thus, the method 500 is an exemplary implementation of optional step 220 of the method 200 shown in FIG. 2.

The inputs utilized by the exemplary method 500 are the following:
the set CMP of colorized measured surface points (which will be empty on the first iteration of the method 500);
The set of colorized implied surface points generated by the current iteration of step 214 (e.g. the method 400 of FIG. 4), which is a subset of CIP;
The spatial index $CIP_{i\_}$index generated by the current iteration of step 214 (e.g. the method 400 of FIG. 4);
The image metadata for the current image $I_i$, which includes an estimate of the position and orientation of the image acquisition unit 22 at the time the image $I_i$ was acquired;
The subset $P_i$ of measured surface points that includes all those are within the field of view of the image acquisition unit when it acquired the image $I_i$; and
The scalars t and nci (the latter is an integer).

The method 500 also uses a suitable three-dimensional spatial indexing and a suitable three-dimensional color interpolation function; such functions are well-known in the art and selection thereof is within the capability of one skilled in the art, now informed by the herein disclosure. For example, the FLANN implementation of the randomized kd-tree index, noted above, may be used as the indexing function and color may be linearly interpolated as described below. As noted above, the integer value nci represents the number of colored points that are required as input by the particular three-dimensional color interpolation function and the scalar value t is a distance threshold value, which may be the same distance threshold value used at step 410 of the method 400 or may be a different value.

At step 502, the method 500 selects an initial measured surface point from the subset $P_i$ of measured surface points that includes all those are within the field of view for the current image $I_i$. Any arbitrary selection process may be used at step 502 so long as it allows for systematic indexing so that all of the measured surface points in the subset $P_i$ of measured surface points can be evaluated.

At step 504, the method 500 uses the three-dimensional position of the current measured surface point to identify a corresponding neighborhood of nearest colorized implied surface points to that measured surface point. This may be achieved using the spatial indexing function in cooperation with the spatial index $CIP_{i\_}$index.

At step 506, the method 500 applies a coloring acceptance test to the neighborhood of nearest colorized implied surface points determined at step 504. Responsive to a determination that the neighborhood of nearest colorized implied surface points fails the coloring acceptance test, ("no" at step 506), the method 500 does not determine a color for the current measured surface point, and the method 500 proceeds to step 508 to check if there are more measured surface points in the subset $P_i$ that have not yet been evaluated. If there are more measured surface points to evaluate ("yes" at step 508), the method 500 proceeds to step 510 to advance to the next measured surface point and then returns to step 504 to evaluate that next measured surface point. If all of the measured surface points in the subset $P_i$ have been evaluated ("no" at step 508), the method 500 ends.

Responsive to a determination that the neighborhood of nearest colorized implied surface points passes the coloring acceptance test ("yes" at step 506), the method 500 proceeds to step 512. At step 512, the method 500 uses the respective colors of each colorized implied surface point in the neighborhood of nearest colorized implied surface points (identified at step 504) to determine the implied color for the current measured surface point, and at step 514 assigns that color to the current measured surface point to form a colorized measured surface point. The implied color is determined using the three-dimensional color interpolation function. For example, the color for the current measured surface point may be linearly interpolated by fitting a plane to the nearest three colorized implied surface points to the current measured surface point. The method 500 then proceeds to step 516 and adds the newly determined colorized measured surface point to the set CMP of colorized measured surface points, and then to step 508 to check if there are more measured surface points in the subset $P_i$ that have not yet been evaluated.

The coloring acceptance test (step 506) comprises testing whether any colorized implied surface points in the neighborhood of nearest colorized implied surface points (identified at step 504) are further away from the three-dimensional position of that measured surface point than the coloring distance threshold t. As noted above, the value of t may be the same as for the positioning acceptance test (step 410) in the method 400 shown in FIG. 4, or it may have a different value. If the coloring acceptance test (step 506) determines that at least one colorized implied surface point in the neighborhood of nearest colorized implied points is further away from the three-dimensional position of that measured surface point than the coloring distance threshold, this results in the neighborhood of nearest colorized implied surface points failing the coloring acceptance test. Conversely, if the coloring acceptance test (step 506) determines that no colorized implied surface points in the neighborhood of nearest colorized implied surface points are further away from the three-dimensional position of that measured surface point than the coloring distance threshold, the neighborhood of nearest colorized implied surface points will pass the coloring acceptance test.

The output from the method 500 is the set of colorized implied surface points CMP, updated with the colorized measured surface points for image $I_i$.

The above-described methods may be implemented on any suitable computer or microprocessor-based system. An illustrative computer system in respect of which aspects of the present invention may be implemented, is presented as a block diagram in FIG. 6. The illustrative computer system is denoted generally by reference numeral 600 and includes a display 602, input devices in the form of keyboard 604A and pointing device 604B, computer 606 and external devices 608. While pointing device 604B is depicted as a mouse, it will be appreciated that other types of pointing device may also be used.

Figure 6:
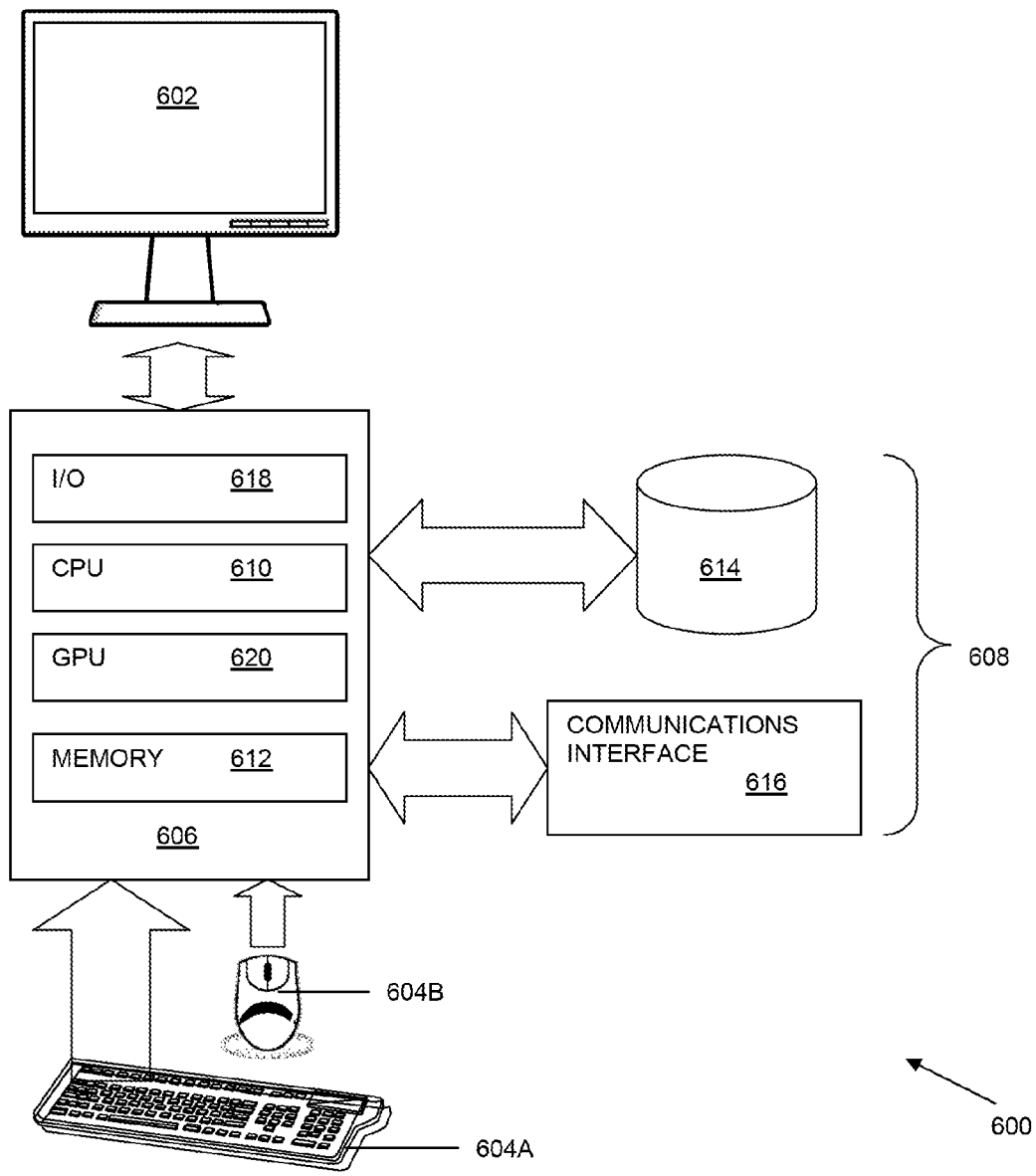
FIG. 6 is a schematic representation of an exemplary computer system which may be used in implementing the methods described herein.

The computer 606 may contain one or more processors or microprocessors, such as a central processing unit (CPU) 610. The CPU 610 performs arithmetic calculations and control functions to execute software stored in an internal memory 612, preferably random access memory (RAM) and/or read only memory (ROM), and possibly additional memory 614. The additional memory 614 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 614 may be physically internal to the computer 606, or external as shown in FIG. 6.

The computer system 600 may also include other similar means for allowing computer programs or other instructions to be loaded. Such means can include, for example, a communications interface 616 which allows software and data to be transferred between the computer system 600 and external systems and networks. Examples of communications interface 616 can include a modem, a network interface such as an Ethernet card, a wireless communication interface, or a serial or parallel communications port. Software and data transferred via communications interface 616 are in the form of signals which can be electronic, acoustic, electromagnetic, optical or other signals capable of being received by communications interface 616. Multiple interfaces, of course, can be provided on a single computer system 600.

Input and output to and from the computer 606 is administered by the input/output (I/O) interface 618. This I/O interface 618 administers control of the display 602, keyboard 604A, external devices 608 and other such components of the computer system 600. The computer 606 also includes a graphical processing unit (GPU) 620. The latter may also be used for computational purposes as an adjunct to, or instead of, the (CPU) 610, for mathematical calculations.

The various components of the computer system 600 are coupled to one another either directly or by coupling to suitable buses.

The methods described herein may be implemented entirely in hardware, entirely in software, or by way of a combination of hardware and software. In a preferred embodiment, the methods are implemented in software, which includes but is not limited to firmware, resident software, microcode, and the like. Furthermore, the methods described herein may be embodied in a computer program product accessible from a computer usable or computer readable medium providing program code for use by or in connection with a computer or any instruction execution system. In such embodiments, the computer program product may reside on a computer usable or computer readable medium in a computer such as the memory 612 of the computer 606, or on a computer usable or computer readable medium external to the computer 606, or on any combination thereof.

Although exemplary embodiments have been described in respect of integrating measured surface points and images obtained from airborne scans of ground terrain, the methods, systems and computer program products described herein are not limited to these applications, and may be used in any appropriate case where it is desired to densify a point cloud of measured surface points representing surface sampling of a physical surface by using images of that same surface having a greater sampling density than that of the surface sampling.

One or more currently preferred embodiments have been described by way of example. It will be apparent to persons skilled in the art that a number of variations and modifications can be made without departing from the scope of the invention as defined in the claims.

What is claimed is:

1. A computer-implemented method for densifying and colorizing a point cloud representation of a physical surface, comprising:

receiving a set of measured surface points representing a surface sampling of a three-dimensional physical surface, each measured surface point having a position in a three-dimensional coordinate reference frame;

receiving at least one image acquired by an image acquisition unit and representing an image sampling of the physical surface;

the image sampling of the physical surface in the at least one image at least partially overlapping the surface sampling of the physical surface;

the image sampling of the physical surface in the at least one image being denser than the surface sampling of the physical surface;

each image being a digital image comprising a plurality of pixels each having a color and an image position in the image;

receiving image metadata associated with each image, the image metadata including an estimate of position and orientation of the image acquisition unit in the coordinate reference frame at the time the image acquisition unit acquired the image to which the image metadata corresponds, the image metadata further including calibration parameters for the image acquisition unit; and for each image:
isolating from the set of measured surface points a subset of measured surface points comprising those measured surface points that are within a field of view of that image;
using the image positions of the pixels in that image, the subset of measured surface points and the image metadata associated with that image to calculate colorized implied surface points;
wherein:
each colorized implied surface point has a position in the coordinate reference frame;
each colorized implied surface point is associated with a corresponding pixel; and each colorized implied surface point has the color of its corresponding pixel.

2. The method of claim 1, further comprising using at least the colorized implied surface points to form a three-dimensional, colored representation of the physical surface in the coordinate reference frame.

3. The method of claim 2, wherein using at least the colorized implied surface points to form a three-dimensional, colored representation of the physical surface in the coordinate reference frame comprises:

for each image:
assigning implied colors to at least some measured surface points in the subset of measured surface points to generate colorized measured surface points;
wherein the implied color assigned to each colorized measured surface point is determined from the colors of nearby colorized implied surface points; and
using the colorized implied surface points and the colorized measured surface points to form the three-dimensional, colored representation of the surface in the coordinate reference frame.

4. A computer program product comprising a non-transitory computer usable medium embodying computer usable program code for densifying and colorizing a point cloud representation of a physical surface, the computer program product comprising:

computer usable program code for receiving a set of measured surface points representing a surface sampling of a three-dimensional physical surface, each measured surface point having a position in a three-dimensional coordinate reference frame;

computer usable program code for receiving at least one image acquired by an image acquisition unit and representing an image sampling of the physical surface, wherein:
the image sampling of the physical surface in the at least one image at least partially overlaps the surface sampling of the physical surface;
the image sampling of the physical surface in the at least one image is denser than the surface sampling of the physical surface; and
each image is a digital image comprising a plurality of pixels each having a color and an image position in the image;

computer usable program code for receiving image metadata associated with each image, the image metadata including an estimate of position and orientation of the image acquisition unit in the coordinate reference frame at the time the image acquisition unit acquired the image to which the image metadata corresponds, the image metadata further including calibration parameters for the image acquisition unit; and computer usable program code for, for each image:
isolating from the set of measured surface points a subset of measured surface points comprising those measured surface points that are within a field of view of that image; and
using the image positions of the pixels in that image, the subset of measured surface points and the image metadata associated with that image to calculate colorized implied surface points;
wherein:
each colorized implied surface point has a position in the coordinate reference frame;
each colorized implied surface point is associated with a corresponding pixel; and
each colorized implied surface point has the color of its corresponding pixel.

5. The computer program product of claim 4, further comprising computer usable program code for using at least the colorized implied surface points to form a three-dimensional, colored representation of the physical surface in the coordinate reference frame.

6. The computer program product of claim 5, wherein the computer usable program code for using at least the colorized implied surface points to form a three-dimensional, colored representation of the physical surface in the coordinate reference frame comprises:

computer usable program code for, for each image:
assigning implied colors to at least some measured surface points in the subset of measured surface points to generate colorized measured surface points;
wherein the implied color assigned to each colorized measured surface point is determined from the colors of nearby colorized implied surface points; and
computer usable program code for using the colorized implied surface points and the colorized measured surface points to form the three-dimensional, colored representation of the surface in the coordinate reference frame.

7. A computer system for densifying and colorizing a point cloud representation of a physical surface, comprising:
  a memory for storing instructions;
  a processing unit coupled to the memory for executing the instructions stored in the memory, wherein the instructions, when executed by the processing unit, cause the computing device to:
    receive a set of measured surface points representing a surface sampling of a three-dimensional physical surface, each measured surface point having a position in a three-dimensional coordinate reference frame;
    receive at least one image acquired by an image acquisition unit and representing an image sampling of the physical surface;
    wherein:
      the image sampling of the physical surface in the at least one image at least partially overlaps the surface sampling of the physical surface;
      the image sampling of the physical surface in the at least one image is denser than the surface sampling of the physical surface; and
      each image is a digital image comprising a plurality of pixels each having a color and an image position in the image;
    receive image metadata associated with each image, the image metadata including an estimate of position and orientation of the image acquisition unit in the coordinate reference frame at the time the image acquisition unit acquired the image to which the image metadata corresponds, the image metadata further including calibration parameters for the image acquisition unit; and
    for each image:
      isolate from the set of measured surface points a subset of measured surface points comprising those measured surface points that are within a field of view of that image;
      use the image positions of the pixels in that image, the subset of measured surface points and the image metadata associated with that image to calculate colorized implied surface points;
      wherein:
        each colorized implied surface point has a position in the coordinate reference frame;
        each colorized implied surface point is associated with a corresponding pixel; and
        each colorized implied surface point has the color of its corresponding pixel.

8. The computer system of claim 7, wherein the instructions, when executed by the processing unit, further cause the computer system to use at least the colorized implied surface points to form a three-dimensional, colored representation of the physical surface in the coordinate reference frame.

9. The computer system of claim 8, wherein the instructions, when executed by the processing unit, cause the computer system to use at least the colorized implied surface points to form a three-dimensional, colored representation of the physical surface in the coordinate reference frame by:
  for each image:
    assigning implied colors to at least some measured surface points in the subset of measured surface points to generate colorized measured surface points;
    wherein the implied color assigned to each colorized measured surface point is determined from the colors of nearby colorized implied surface points; and
  using the colorized implied surface points and the colorized measured surface points to form the three-dimensional, colored representation of the surface in the coordinate reference frame.

* * * * *

UNITED STATES PATENT AND TRADEMARK OFFICE
CERTIFICATE OF CORRECTION

PATENT NO. : 9,269,188 B2  
APPLICATION NO. : 14/700224  
DATED : February 23, 2016  
INVENTOR(S) : Pollock et al.

It is certified that error appears in the above-identified patent and that said Letters Patent is hereby corrected as shown below:

In the specification

Column 8, Line 11, "surface points $\{P_h$" should read -- surface points $\{P_1$ --

Column 11, Line 21, "surface points $\{P_h$" should read -- surface points $\{P_1$ --

Column 11, Line 29, "variable Initialization" should read -- variable $\underline{u}_i$. Initialization --

Column 11, Line 42, "surface point $P_{ki}$ the" should read -- surface point $P_k$, the --

Column 12, Line 43, "surface points P," should read -- surface points $P_i$ --

Column 12, Line 63, "to set a equal" should read -- to set $\underline{u}_i$ --

Column 13, Line 8, "surface points P," should read -- surface points $P_i$ --

Column 13, Line 17, "surface points P," should read -- surface points $P_i$ --

Column 13, Line 29, "points P," should read -- points $P_i$ --

Column 13, Line 42, "subset $P_1$," should read -- subset $P_i$ --

Column 13, Line 60, "surface points P," should read -- surface points $P_i$ --

Column 14, Line 23, "$\{P_1, P_2, ..., P_n P_n\}$." should read -- $\{P_1, P_2, ..., P_n\}$. --

Column 14, Line 53, "current image L." should read -- current image $I_i$. --

Column 16, Line 9, "of the set P," should read -- of the set $P_i$ --

Signed and Sealed this  
Third Day of May, 2016

Michelle K. Lee  
*Director of the United States Patent and Trademark Office*